Nov. 28, 1961 E. G. RAMBERG Re. 25,091

CATHODE-RAY TUBES OF THE LENTICULAR GRILL VARIETY

Original Filed March 18, 1952 4 Sheets-Sheet 1

INVENTOR
EDWARD G. RAMBERG
BY
Roderick Malcolm
ATTORNEY

CATHODE-RAY TUBES OF THE LENTICULAR GRILL VARIETY

Original Filed March 18, 1952 4 Sheets-Sheet 2

INVENTOR
EDWARD G. RAMBERG
BY
Roderick Malcolm
ATTORNEY

CATHODE-RAY TUBES OF THE LENTICULAR GRILL VARIETY

Original Filed March 18, 1952 4 Sheets-Sheet 3

INVENTOR
EDWARD G. RAMBERG
BY
Rodrick Malcolm
ATTORNEY

CATHODE-RAY TUBES OF THE LENTICULAR GRILL VARIETY

Original Filed March 18, 1952 4 Sheets-Sheet 4

INVENTOR
EDWARD G. RAMBERG
BY
Roderick Malcolm
ATTORNEY

United States Patent Office

Re. 25,091
Reissued Nov. 28, 1961

25,091
CATHODE-RAY TUBES OF THE LENTICULAR GRILL VARIETY

Edward G. Ramberg, Upper Southampton Township, Bucks County, Pa., assignor to Radio Corporation of America, a corporation of Delaware Original No. 2,728,024, dated Dec. 20, 1955, Ser. No. 277,182, Mar. 18, 1952. Application for reissue Oct. 10, 1956, Ser. No. 615,213
21 Claims. (Cl. 315—17)

Matter enclosed in heavy brackets [ ] appears in the original patent but forms no part of this reissue specification; matter printed in italics indicates the additions made by reissue.

This invention relates to color-kinescopes and other cathode-ray tubes of the kind wherein electrons are subjected to a focusing action near the screen. The present invention finds useful application in color-television and stereoscopic-television systems where it may be employed in the "camera" of the transmitter and, at the receiving end, as part of the image reproducing system.

French Patent 866,065 to Dr. Werner Flechsig (published June 16, 1941) and its German equivalent 736,575 (published June 22, 1943) describe a color-kinescope containing a bi-part screen assembly which comprises (i) a transparent viewing screen having a target surface made up of a multiplicity of groups of parallelly arranged strips or lines of different (e.g. red, blue and green) color-emissive areas and (ii) a grill formed of a large number of spaced apart wires mounted adjacent to the target side of said screen. The beam electrons travel in substantially straight paths through the space between the grill and the screen. These straight beam-paths terminate, ideally, on respectively different ones of the (red, blue and green) line-like screen areas. The proper geometrical location of the grill wires provides a Crookes-shadow which masks those line-like screen areas which at any given instant are to remain unilluminated.

One very real limitation upon the efficient use of the above described "Crookes-shadow tubes" is that only a small percentage of the beam electrons ever reach the viewing screen; the larger percentage being dissipated (in the form of heat) upon impact with the imperforate parts of the grill or "mask." This limitation was recognized by Dr. Flechsig and his patents mention that it can be minimized (a) by making the mask wires of such fine gauge that the Crookes-shadow is no longer a factor in the operation of the tube and (b) by substituting for the Crookes-shadow effect a beam-focusing cylindrical-lens effect which he achieved by operating the viewing screen at a relatively high potential with respect to the fine wire grill.

Color-kinescopes which incorporate electron pervious focusing electrodes in the vicinity of the screen or target, and which are hereinafter referred to as being of the "lenticular grill" variety, are far more efficient than those operating on the Crookes-shadow principle. However the color images produced by lenticular grill tubes are frequently marred by color dilution, halo effects, low contrast, and other image defects commonly associated with cathode-ray tubes of the "post-accelerated" variety. A "post-accelerated" cathode-ray tube is here defined as one wherein the electron beam or beams are subjected to an auxiliary accelerating force immediately prior to their arrival at the screen.

In post-accelerated cathode-ray tubes (including those of the lenticular grill variety) the defects in the reproduced image may be traced, principally, to back scattering resulting from the post-accelerated beam impinging upon the screen or target. As here used the term "back-scattered" refers to electrons leaving the screen as a result of the impingement thereon of beam electrons. The back-scattered electrons upon losing their initial rearward momentum turn toward the screen and impinge thereon with the high velocity with which they were endowed at their scattering point on the screen. The return paths of the back-scattered electrons are of arcuate contour and terminate at points spaced from the elemental screen-area upon which the beam itself impinged. These points usually define the boundaries of an optically disturbing halo. Thus, several screen areas of different color-emissive characteristics may be, and frequently are, illuminated at a time when the beam is intended to actuate a screen-area of but a single color. Such undesired color dilution and halo effects are augmented by the presence of other "spurious" electrons, e.g. secondary electrons released by impact of the beam upon the lenticular-grill. The secondary electrons, though initially of very low velocity, are accelerated by the highly positive field adjacent to the screen and, like the back-scattered electrons, illuminate randomly located color areas on the screen.

Accordingly, the principal object of the present invention is to achieve, in a cathode-ray tube, the efficient utilization of the scanning beam, or beams, without loss of contrast and, in the case of a color-tube, without color dilution resulting (a) from the return of high velocity back scattered electrons to the fluorescent screen as well as from (b) the acceleration of low velocity secondary electrons from other elements in the tube.

Stated generally, the foregoing and related objects are achieved, in accordance with the invention, by the provision within a cathode-ray tube of a target assembly comprising (1) an electrically conductive line-like or dot-like screen and (2) two or more field electrodes or lens elements each containing a multiplicity of apertures, with the apertures of at least one of said field electrodes arranged in a pattern which is geometrically related, in a manner later specified, to the line-like or dot-like ray-sensitive areas on the screen.

In a preferred embodiment of the invention, the voltage applied to whichever one of the field electrodes that lies next adjacent to the target surface of the image screen is made substantially equal to or greater than the voltage applied to said target surface. As a consequence, there is no field adjacent to the screen capable of driving back-scattered electrons toward the screen. Similarly, there is no field capable of accelerating low-velocity secondary electrons (emitted by impact of beam electrons upon the field electrodes) toward the screen. Thus, the only parts of the screen that are activated at any given moment are those elemental or sub-elemental screen areas which lie directly in the path of the scanning beam or beams. (Any high-velocity secondary electrons which may be released by impact of the beam electrons upon the fine wires of the field electrodes are so few in number that they have no appreciable adverse effect upon the image.)

When the field electrodes and target electrode are energized in the above-specified manner the target assembly may be said to comprise an electron-lens system consisting of one set or array of converging lenses and one array of diverging lenses. The electric field of the diverging lens-array tends to defocus the beam and hence to distort its pattern of impact upon the mosaic surface of the target electrode. However, the unique structure of the lens elements and their novel orientation with respect to the screen operate to confine the boundaries of the distorted beam to the particular areas of the screen which have been selected for illumination. More specifically, where a so-called "line" screen is employed in conjunction with two lenticular grill elements, color dilution which might otherwise result from the defocusing or divergent effect of one of the lenticular grills is obviated, in accordance with the invention, either (a) by so orienting said grill that the divergence is predominated in a direction along the color-lines on the screen and hence does not produce any color dilution, or (b) where either a "line" or "dot" screen is employed the wires of the grill which produce the defocusing effect may be made so fine and so closely spaced that said defocusing effect is negligible as compared to the diameter of the "dots" or width of the "lines," and is thus invisible to the viewer.

The invention is described in greater detail in connection with the accompanying four sheets of drawings, wherein:

FIGS. 1a, 1b, 1c and 1d are a series of potential or voltage plots which will be referred to in explaining the "positive" and "negative" field changes occurring in the target assembly of the tube of FIG. 1;

Figure 1:
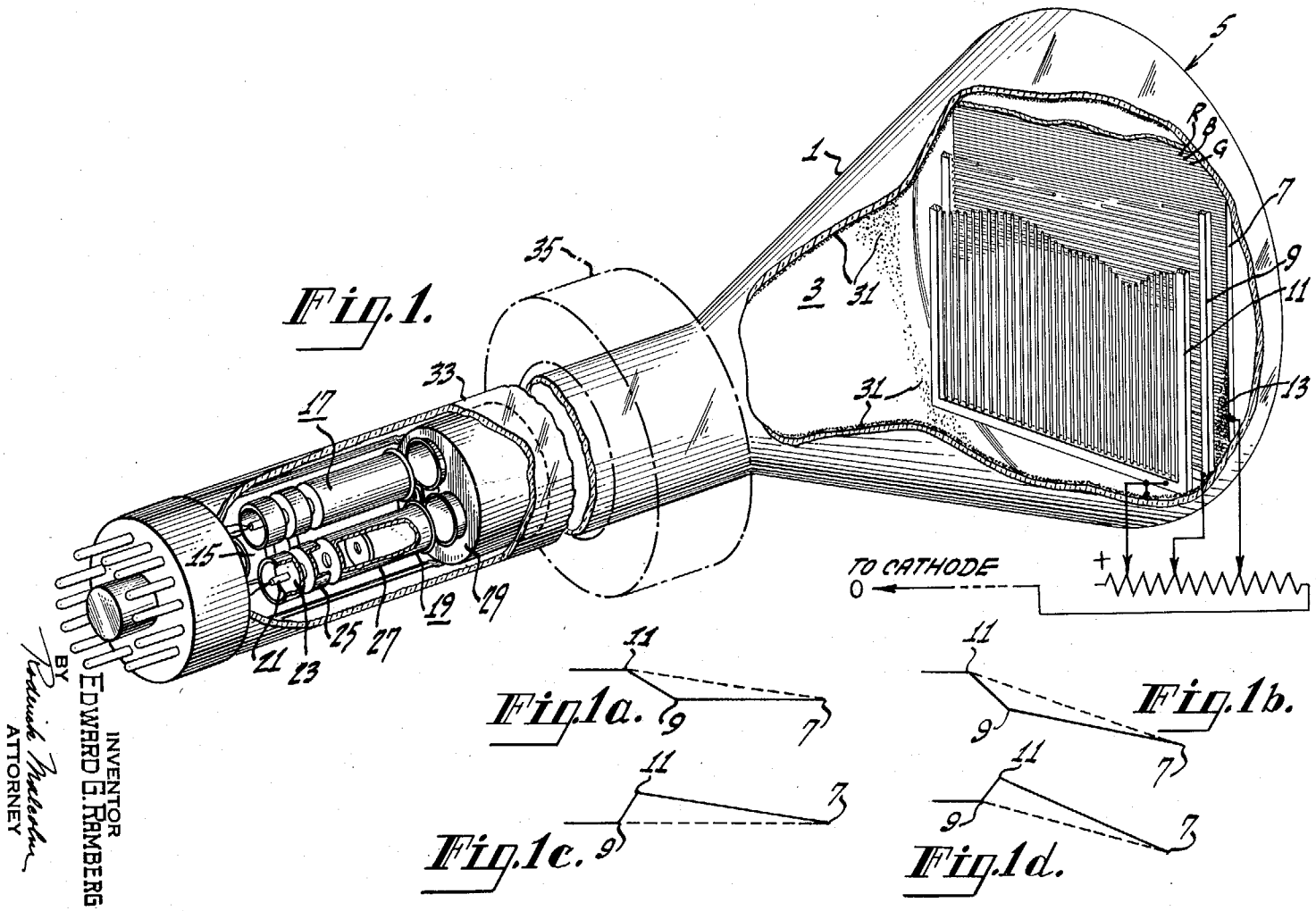
FIG. 1 is a partly broken-away view in perspective of a three-gun color kinescope of the line-screen variety containing a tri-part target assembly with its several elements constructed and arranged in accordance with the principles of the invention.
Figure 2:
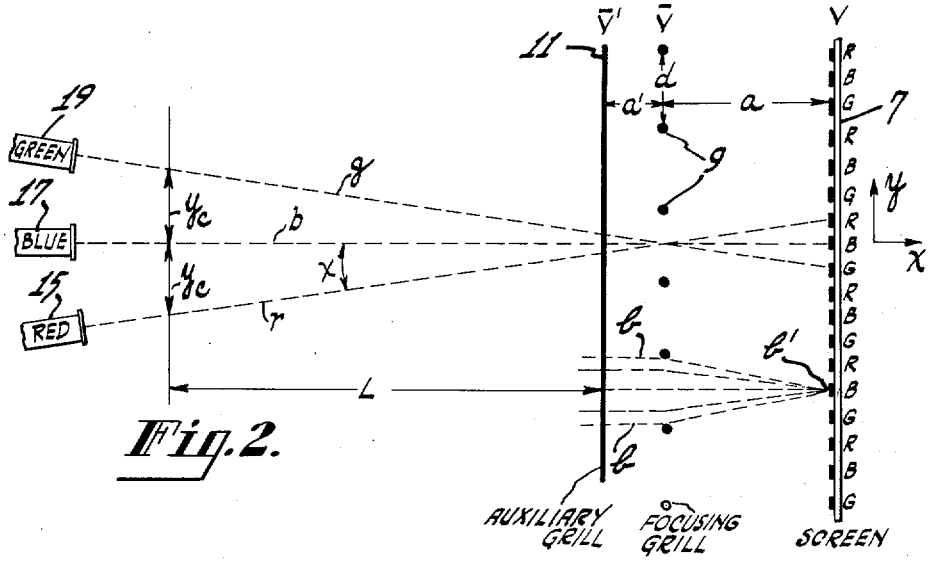
Figure 3:
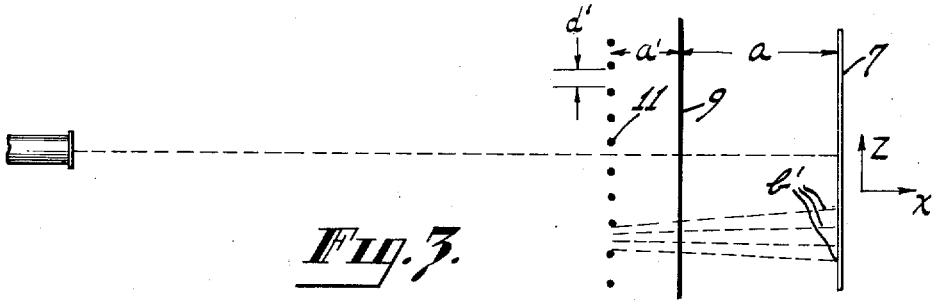
Figure 4:
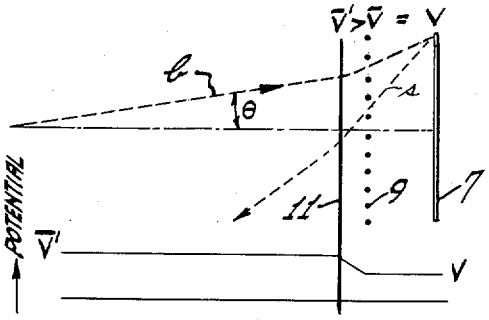
Figure 5:
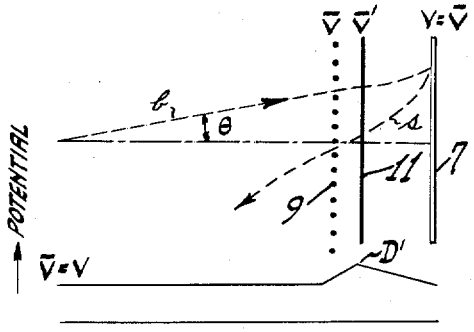
Figure 6:
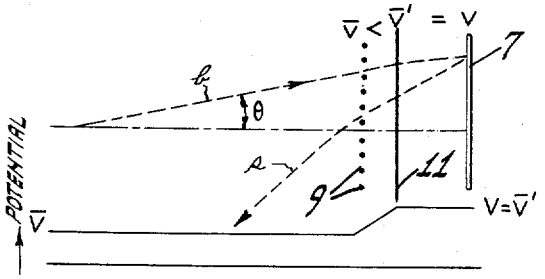
Figure 8:
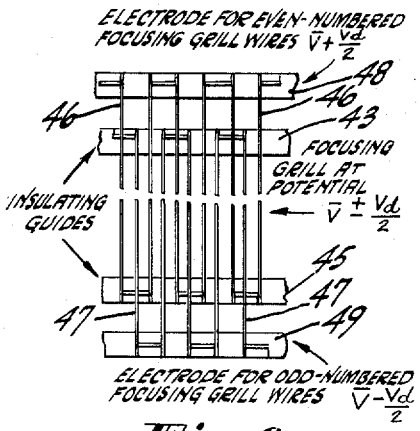
Figure 7:
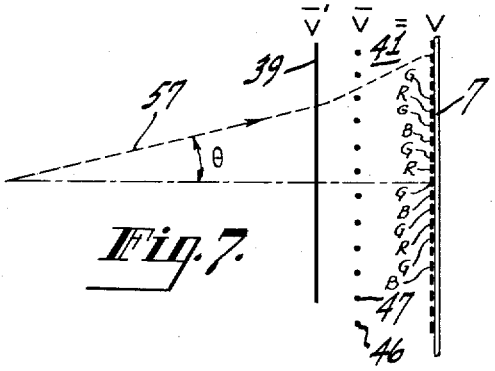
Figure 9:
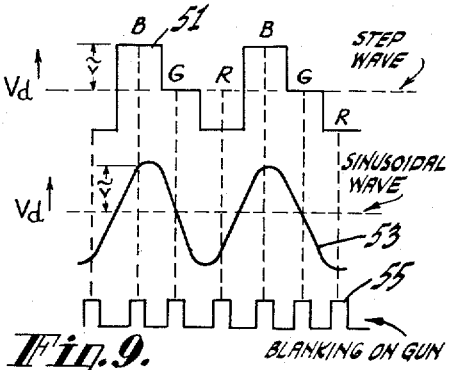
Figure 10:
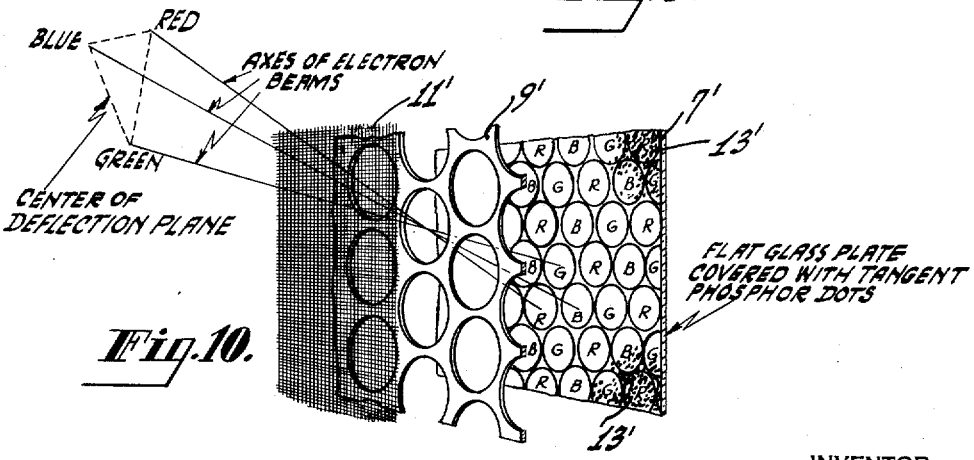
Figures 11, 12, 13, 14:
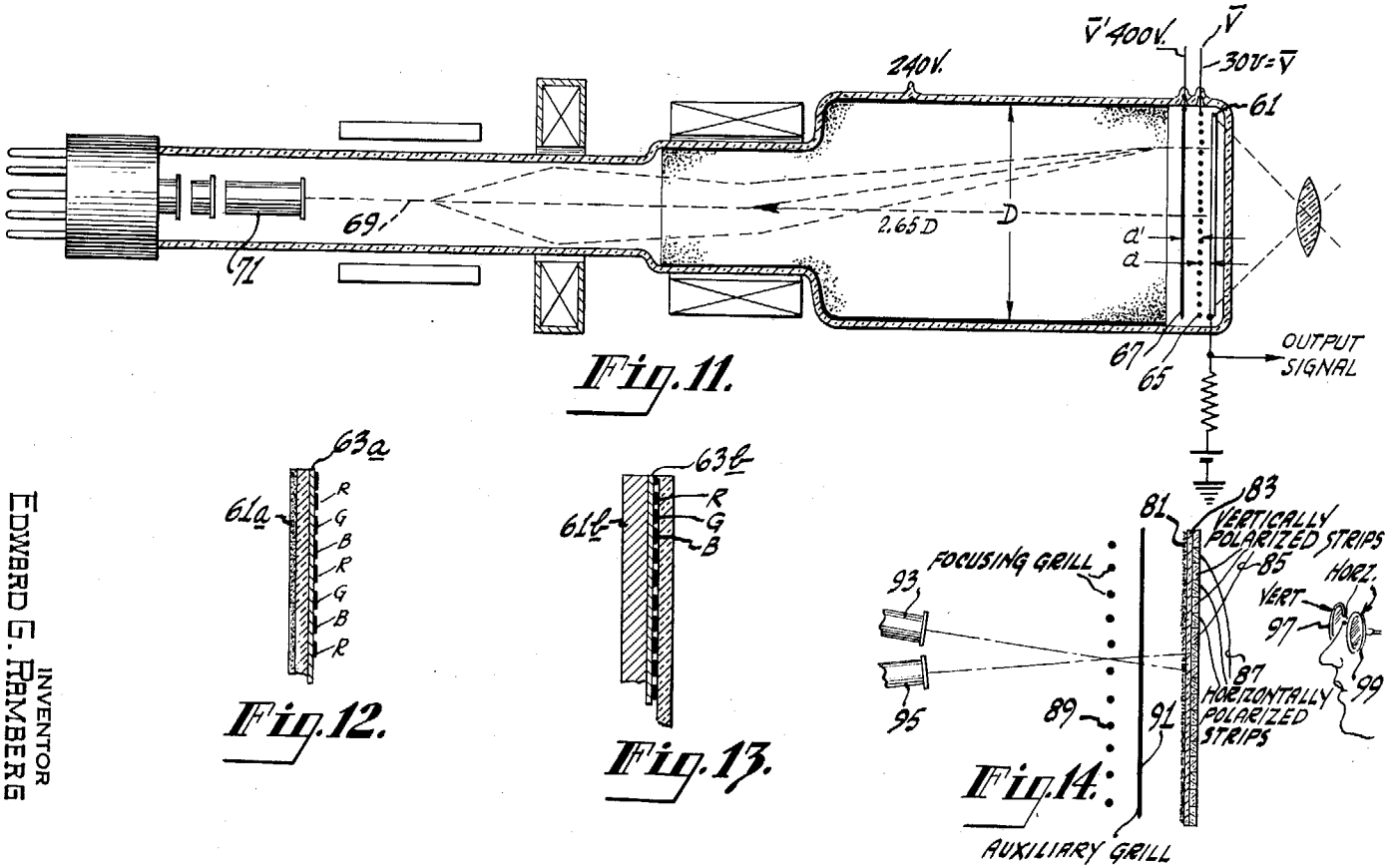

FIG. 2 is a partly diagrammatic side elevation of the gun and target assemblies of the tube of FIG. 1 but showing a linear (instead of triangular) arrangement of the three guns; the drawing being marked with lines indicative of the paths of the three beams, with symbols indicative of the spacing and voltages applied to the separate elements of said assembly, and also with lines indicative of the converging effect of the focusing grill upon the beam electrons;

FIG. 3 is a diagrammatic view similar to FIG. 2 but with the tube turned 90° to show the defocusing or divergent effect of the auxiliary grill upon the beam electrons;

FIG. 4 is a diagrammatic view similar to FIG. 2 (but showing a single beam), the drawing being marked with lines indicative of a preferred relative voltage distribution among the three electrodes of the screen assembly in the tubes of FIGS. 1 and 2;

FIG. 5 is a diagrammatic view similar to FIG. 4 but showing a different relative arrangement of the two grill elements of the target assembly, and a different relative voltage distribution;

FIG. 6 is a diagrammatic view showing the grill assembly of FIG. 5 with still another relative voltage distribution among the three elements of the screen or target assembly;

FIG. 7 is a diagrammatic view showing the invention as applied to a cathode-ray tube of the "switching-at-the-screen" variety disclosed in Schroeder U.S. P. 2,446,791; the relative arrangement of the color areas on the screen being essentially similar to that shown in said patent;

FIG. 8 is a view from the rear of the bi-part focusing and switching grill of the tube of FIG. 7;

FIG. 9 is an electrical diagram of certain operating voltages applied to the tube elements of FIG. 7;

FIG. 10 is a view in perspective of a target assembly including two apertured grills of a construction suitable for use in connection with a target of the "dot screen" variety;

FIG. 11 is a longitudinal sectional view of the invention as applied to a color camera or "pickup" tube;

FIG. 12 is a fragmentary sectional view of the photo-emissive screen or target electrode of the pickup tube of FIG. 11;

FIG. 13 is a view similar to FIG. 12 but showing a photoconductive (instead of photo-emissive) screen and;

FIG. 14 is a partly diagrammatic side elevation of a stereoscopic black-and-white kinescope embodying the invention.

The color-kinescope shown in FIG. 1 comprises an evacuated envelope 1 having a main chamber 3 in the form of a frustum which terminates at its large end in a window 5 through which the obverse face of the viewing screen 7 of a tri-part target-assembly 7, 9, 11 may be viewed. The viewing screen 7, here illustrated, is of the "line-screen" variety described in the French and German Flechsig patents, previously mentioned. It is provided on its rear or target surface with a multiplicity (say, 1500 or more) of parallelly disposed phosphor lines R (red), B (blue), G (green) of different color-emissive characteristics, arranged in a repetitive pattern in groups of three. These parallel lines R, B and G are here shown as extending horizontally across the screen, they may however extend vertically, or at an angle with respect to said directions. An electron-transparent light-reflecting film 13 constituted, for example, of evaporated aluminum, renders the entire target surface of the screen conductive. The other elements of the screen or target-assembly comprise two wire-grills 9 and 11 mounted in spaced apart parallel planes in front of the conductive target surface of the screen 7. The spacing, orientation and functions of these grills 9 and 11 are described in detail later on in this specification.

The beam source of electrons, and the beam-focusing and deflecting means employed for scanning the target assembly 7, 9, 11 may comprise any of the several single or multiple gun-systems suitable for use in connection with color-television tubes. Where, as illustrated in FIGS. 1 and 2 the tube is of the three-gun variety, the three electron guns 15, 17 and 19 are individual to the three screen colors. As indicated by the broken lines, r, b and g (FIG. 2) the beams approach the target assembly along converging paths and eventually impinge upon separate ones of the color phosphor lines R, B and G, respectively. If the tube is of the one-gun variety, suitable auxiliary deflecting means may be employed for directing the beam to points corresponding to the points of origin of the three-gun beams, so that it too approaches the target assembly along discrete converging paths individual to the different colors. (As to this see FIG. 2 of the Flechsig patents. See also copending application of Russel R. Law, Serial No. 143,405, filed February 10, 1950, now U.S. Patent 2,696,571, issued December 7, 1954).

The particular triangular or "delta" arrangement of the three guns 15, 17 and 19 illustrated in FIG. 1 is claimed by Alfred C. Shroeder in copending application, Serial No. 730,637, filed February 24, 1947, now U.S. Patent No. 2,595,548, issued May 6, 1952. The gun structure, per se, are claimed by Hannah C. Moodey in copending application Serial No. 295,225, filed June 24, 1952, as a continuation-in-part of application Serial No. 166,416, filed June 6, 1950, now abandoned. The guns are of duplicate construction and comprise an indirectly heated cathode 21, a control grid 23, a short cup-like screen-grid electrode 25, a first accelerating electrode 27 and a second accelerating electrode consisting essentially of a tubular portion 29 common to the three guns. A conductive coating 31 on the inner surface of the main chamber 3 and neck 33 of the envelope 1 comprises a third accelerating electrode. In operating the tube, the three beams are simultaneously scanned over the target assembly by scanning fields produced by two pairs of deflecting coils contained in a yoke structure 35. Thus each beam is directed to the sub-elemental screen areas of the color to which that beam is allotted.

As previously mentioned, the advantages of the present invention flow from the addition of a suitably oriented and suitably energized auxiliary grill, to the "lenticular-grill" tubes of the Flechsig patents. The auxiliary grill 11 may be mounted either adjacent to the gun side of the focusing grill 9 (as in FIGS. 1–4, 7, 10 and 11) or intermediate the focusing-grill 9 and the screen or target electrode 7 (as in FIGS. 5 and 6). In line-screen tubes the wires of the focusing grill 9, wherever situated, extend substantially parallel to the line-like areas R, B and G on the screen and the space (d, FIG. 2) between adjacent ones of said wires is preferably aligned with the central line (e.g. the blue line B) of each group (R, B and G) of lines. The wires of the auxiliary grill 11, on the other hand, extend substantially at right angles with respect to the screen-lines R, B and G. Irrespective of the relative position of the two grills 9 and 11, it is desirable to make the field strength zero on the gun side of the target structure, since this prevents distortion of the scanning pattern by any irregularities of the electrodes in this region. As shown in FIG. 1, a zero field on the gun side of the target assembly can be achieved simply by connecting the first field-electrode (in this case, the auxiliary grill 11) to the conductive coating 31 on the inner surface of the envelope 1.

Under normal operating conditions the voltage applied to the conductive target surface 13 (FIG. 1) of the screen 7 is of the order of, say 12,000 volts. At this voltage the primary electrons of which the beam is comprised "back-scatter" upon incidence on the screen, i.e. release both high and low velocity secondary electrons from the conductive target surface 13 of the screen. As previously mentioned, in post-accelerated tubes e.g. of the Flechsig French and German patents, the back-scattered and other spurious electrons, upon losing their initial rearward velocity are drawn toward the screen in arcuate paths that terminate at points spaced from the screen area upon which the beam itself impinged, thus giving rise to color dilution and other image defects. In operating the plural grill tubes of the present invention the preferred practice is to make the voltage applied to whichever one of the grills that lies next adjacent to the screen or target either substantially equal to or greater than the voltage of the screen or target electrode 7. (Here all voltages are assumed to be measured with respect to the voltage of the cathodes as zero.) As a consequence of such a voltage distribution there is no field in front of the fluorescent screen capable of attracting back-scattered electrons toward the screen, nor is there any field capable of accelerating low-velocity secondary electrons emitted by the grill wires to such a velocity that they will create annoyingly distributing luminous effects on said screen.

Before proceeding with the detailed description of the invention it may be well to recall that the lens action at a field electrode depends upon the sign of the change in field which takes place at that electrode. If the field in front of such an electrode (i.e. on its "gun side") has a greater tendency to accelerate the beam than has the field on its opposite side (i.e. in the direction of the "target") then the field change is positive and causes the beam electrons to diverge. If, on the other hand, there is a negative change in field the beam electrons will converge adjacent to that electrode.

With the above in mind it will be apparent that in a target assembly having but a single grill (as in the Flechsig patents) the field change at the grill must be negative since the field between the grill and the target screen must be such as to accelerate the beam electrons. Such a field will, at the same time, draw back-scattered electrons and secondary-electrons generated at the focusing grill, to the target screen. If the voltage of Flechsig's single grill, relative to the target, should be reversed the incidence of such "spurious" electrons on the target screen would be suppressed, but no converging lens action whatever would be achieved at the grill. Thus, obviously, the objects of the present invention could not be attained by the use of a two-element target assembly.

The addition of an auxiliary grill makes is possible to obtain the desired negative field change, and consequent converging lens action, at the focusing grill without of presence of fields within the target structure which will result in the arrival of spurious electrons at the target screen. Furthermore, the apertures in this auxiliary grill need not be geometrically aligned with those of the focusing grill, as they must be in the plural grill lens tubes of Epstein U.S. Patent 2,315,367.

In tubes constructed in accordance with the principles of the present invention it is the function of the "focusing grill" 9, wherever situated, to concentrate the beam electrons on the appropriate line-like (or dot-like) screen areas, in much the same manner as the grill of the two-electrode target assembly of the Flechsig patents. It is the function of the auxiliary grill 11, wherever situated, to make possible a field distribution in the target assembly 7—9—11 which prevents (i) the return of back-scattered electrons to the target 7 and (ii) the acceleration of secondary-electrons from the focusing grill 9 to the target, without interfering with the above-mentioned focusing action of said focusing grill.

Assuming that the field on the gun-side of the target structure is zero, then if the above described functions of the focusing grill 9 and auxiliary grill 11 are to be fulfilled the lens action at the apertures of the auxiliary grill 11 must be diverging because (1) in order to perform its focusing function the field change at the focusing grill 9 must be of negative sign, (2) in order to avoid harmful effects from the back-scattered and secondary-electrons the potential of the target must be substantially the same as or lower than the grill electrode 9 or 11 which lies adjacent to the screen. All of this will the more readily be apparent upon inspection of the potential plots shown in the drawings.

In FIGS. 1a to 1d an angle that opens upwardly corresponds to a negative field change and converging lens action. An angle that opens downwardly corresponds to a positive field change and diverging lens action. Here it will be seen that if the focusing grill 9 lies between the auxiliary grill 11 and the target 7 (as it does, for example in FIGS. 1 to 4, inclusive) the actual potential variation must lie below a line joining 11 and 7. This line 11—7 slopes downwardly whether the potential of the target 7 is equal to the potential of either the focusing or the auxiliary grills (as in FIG. 1a, or whether the potential of the target 7 is lower than the potentials of both of said grill electrodes 9 and 11 (as in FIG. 1b). On the other hand, referring now to FIGS. 1c and 1d, if the auxiliary grill 11 lies between the focusing grill 9 and the target or screen 7 (as it does, for example in FIGS. 5 and 6) the actual potential variation at the auxiliary grill 11 must necessarily lie above the line (9—7) joining the focusing grill 9 and the target 7 (to make the angle at 9 open upwardly). The angle at 11 is then seen to open downwardly, corresponding to a diverging lens action.

As an example of the voltages which may be used in the practice of the present invention; if the screen 7 is at 12,000 volts, the focusing electrode 9 at 12,000 volts and the auxiliary grill 11 at 15,000 volts, focusing can be achieved by the focusing grill 9 because the field change at the focusing grill 9 is negative. Likewise if voltages of 20,000, 15,000 and 10,000 were assumed for auxiliary grill 11, focusing grill 9 and screen 7, respectively, and if the spacing between the grills is less than that between the focusing grill 9 and the target 7, as in examples hereinafter given in this application, convergence will be achieved because of the negative field change at the focusing grill 9. In both of the above examples, the field change at the auxiliary grill 11 is seen to be positive and hence the lens action at this grill is divergent.

The fact that the field change at the auxiliary grill 11 is, quite generally, positive and the lens action at this grill is, correspondingly, divergent, is seen to be confirmed by the two examples given above.

In a tube employing a line-screen the divergent action at the auxiliary grill 11 is, however, in the direction along the phosphor lines R, B and G on the target and hence does not result in color dilution because the wires of the auxiliary grill are approximately perpendicular to the wires of the focusing grill (and approximately so to the phosphor lines). It does, however, render the scanning beam astigmatic, so that if it focuses sharply in a direction perpendicular to the phosphor lines it does not do so in a direction at right angles thereto. This effect, however, can be minimized (as explained in connection with Formula No. 3) by employing a sufficiently small grill wire spacing in the auxiliary grill. If this spacing (d', FIG. 3) is comparable with the separation of the scanning lines, moiré effects may be produced, which however can be minimized by scanning the screen at 45° to the phosphor lines.

When the field change at the focusing grill 9 is negative the resultant lens field adjacent to each pair of wires in said focusing grill is that of a cylindrical lens whose generatrices are substantially parallel to the color lines (R, B and G) on the line-screen or target 7. As a consequence, the lens action of said grill 9 is such as to converge the beam electrons toward the long central axis of each of said lines, the lens action at the auxiliary grill 11 being divergent.

FIGS. 4 and 5 illustrate two realizations of the invention which have the advantage of requiring only one voltage in addition to those employed in a tri-color kinescope of the kind (e.g. "Crookes shadow") which operate without "focusing at the screen." These separate embodiments of the invention will be referred to as Cases I and II.

In FIG. 4 (as in FIG 1) the focusing grill 9 is next adjacent to the fluorescent screen 7 and the auxiliary grill 11 is nearer the gun, i.e. adjacent to the "gun side" of the focusing grill.

In FIG. 5 the auxiliary grill 11 is next adjacent to the fluorescent screen 7 and the focusing grill 9 is adjacent to the "gun side" of the auxiliary grill 11.

In both cases the voltage ($\overline{V}$) of the focusing grill 9 is made equal to the voltage (V) of the screen 7 and in both cases the voltage ($\overline{V}'$) of the auxiliary grill 11 is made higher than V and $\overline{V}$.

As indicated by the dotted lines s in FIGS. 4 and 5, the electrons scattered back at the target, under the above specified operating voltages, are directed away from the screen 7 where they may be collected by the conductive coating 31 (FIG. 1) on the inner surface of the main chamber 3.

The behavior of the electrons in passing through the grill assembly can be inferred from the lens action of a slit lens, which is well known to deflect an electron incident on it at a distance h from its center (in the plane of the slit) by an angle:

$$a(E_2-E_1)/(2V) \qquad (1)$$

where $E_2$ and $E_1$ are the electric fields prevailing on the side of incidence and on the side of departure, respectively, and V is the accelerating voltage of the electron as it passes through the center of the slit, and second from the known parabolic shape of the paths of electrons moving in uniform electric fields. It may be slated that the formula for the lens action is satisfied very accurately as long as the angles of convergence and divergence are small, a condition generally satisfied in the instant cases.

Below are shown the calculated characteristics of grill-screen systems with the properties indicated in FIGS. 4 and 5. In both FIGS. 4 and 5 and in the following formulae the distance between the screen 7 and the grill (9 or 11) next adjacent thereto is designated a and the distance between grills is designated a'; the spacing between the wires of the focusing grill is designated d, and between the wires of the auxiliary grill, d'.

SYSTEM I (FIG. 4).—CONDITION OF SHARP FOCUS

A parallel beam of electrons (exemplified by the "blue" beam b) incident on the focusing grill 9 will be focused into a series of sharp lines (b', FIG. 2) on the phosphor screen for a particular relationship between the ratio of the inter-grill distance (a') and the focusing-grill-screen distance (a) and the ratio of the auxiliary grill voltage ($\overline{V}'$) and the focusing-grill (and phosphor-screen) voltage (V). This relation is:

$$\frac{a'}{a}=\frac{\overline{V}'-V}{2V} \text{ or } \frac{\overline{V}'}{V}=1+\frac{2a'}{a} \qquad (2)$$

Typical values which fulfill this relationship are $\overline{V}'=15{,}000$ volts, $V=12{,}000$ volts, $a=0.75$ inch, and $a'=a/8=0.09375$ inch. If this relation is not fulfilled, the lines into which the electron beam are concentrated are broadened, the degree of broadening increases with increasing departure from the parameter values given by the equation.

MAXIMUM BROADENING OF SCANNING SPOT IN DIRECTION OF WIRES OF FOCUSING GRILL AND OF PHOSPHOR LINES

The electrical fields about the wires of the auxiliary grill 11 tend to diverge or spread the scanning spot b' in a direction along the phosphor lines. (See FIG. 3.) This spreading is a maximum for a sharply focused electron beam which strikes a wire of the auxiliary grill.

If the condition of sharp focus, indicated above, is fulfilled, the beam will be split into two parts, which will strike the phosphor screen a distance:

$$2\Delta z=d' \qquad (3)$$

apart. Here d' is the separation of wires in the anxiliary grill. The distance d' thus represents the maximum broadening of the scanning spot along the phosphor lines, resulting from the presence of the auxiliary grill. For an auxiliary grill of the mesh type shown in FIG. 10 very nearly the same relation applies, if d' now represents the diameter of the apertures in the grill; however, here the beam spreading takes place in all directions.

RELATION BETWEEN CONVERGENCE OF BEAMS AND GEOMETRICAL DIMENSIONS OF STRUCTURE. (CONDITION OF SHARP FOCUS ASSUMED)

In a tri-color kinescope where three guns are provided, the guns are so placed and the beams issuing from them so tilted relative to each other that the beams strike at all times the red, green, and blue phosphor lines, respectively. Assume, for example, that the "blue" gun is placed in a plane bisecting the tube and parallel to the phosphor lines. Then the centers of deflection for the "red" and "green" beams are displaced a distance $\pm y_c$ from this bisecting plane; furthermore, the red and green beams are given tilt-components at right angles to the bisecting plane equal to $\pm\alpha$. The angle $\alpha$ will be called the "convergence angle." For a given placement of the guns—i.e. a given value of $y_c$—the distances a and a' must be chosen so that, for a value of $\alpha$ which causes the beams to converge on identical points on the focusing grill, each beam strikes only the appropriate phosphor lines. The condition that the three beams reach the same point on the focusing grill (more accurately, the same line parallel to the phosphor lines) is given by:

$$\alpha=\frac{\frac{y^c}{2a'}}{L+\left(\frac{V}{\overline{V}'}\right)\frac{1}{2}+1} \qquad (4)$$

At the same time, the value of "a" must be such that a ray with the initial tilt $\alpha$ strikes the screen with a displacement equal to the separation of centers of two adjoining (e.g. blue and red) phosphor lines. Since his separation is $M_0d/3$, where $M_0$ is the magnification with which a scanning beam projects the focusing-grill patern on the phosphor screen, $\alpha$ and "a" must satisfy the relation:

$$-\alpha=\frac{dM_0}{3a}\sqrt{\frac{V}{\overline{V}'}} \qquad (5)$$

Elimination of $\alpha$ from the last two equations and expression of the voltage ratio in terms of a'/a with the aid of the condition of sharp focus leads to the following equation for a:

$$a=\frac{L}{\frac{d}{3y_c}\sqrt{1+\frac{2a'}{a}}}\Big/\left(1-\frac{d}{3y_c}\sqrt{1+\frac{2a'}{a}}\right) \tag{6}$$

Now the magnification $M_0$ of the focusing grill pattern projected by a ray proceeding from the center of deflection on the screen is:

$$M_0=1+\frac{a\sqrt{1+\frac{2a'}{a}}}{L+a\sqrt{1+\frac{2a'}{a}}\left(\sqrt{1+\frac{2a'}{a}}-1\right)} \tag{7}$$

Here L (see FIG. 2) is, once more, the distance from the center of deflection to the grill nearest the gun. For L=13 inches and a=0.75 inch, a'=a/8, as before, we see that $M_0=1.064$. Furthermore, with d=0.0208" (1/48 inch) the preceding equations indicate as the proper values for $\alpha$ and $y_c$: $\alpha=0.0088$ radian (0.5°), $y_c=0.115$ inch.

RELATION BETWEEN PHOSPHOR LINE PATTERN AND FOCUSING GRILL PATTERN

If we consider a ray leaving the center of deflection at an angle $\theta$ to the tube axis, aimed so as to pass through centers of slit lenses in both grills, the radial coordinate $r_s$ of the point of incidence on the phosphor screen is related to the radial coordinate $r_g$ of the point of incidence on the focusing grill by:

$$\frac{r_s}{r_g}=1+\frac{a\cos\theta\left(\sqrt{\cos^2\theta-\frac{2a'}{a+2a'}}\right)}{L+(a+2a')\cos\theta\left(\cos\theta-\sqrt{\cos^2\theta-\frac{2a'}{a+2a'}}\right)}$$

$$=M_0+(M_0-1)\frac{a'}{a}\sin^2\theta+\ldots \tag{8}$$

The intersections of these rays with the screen define the position of the centers of the blue phosphor lines on the screen. The ratio $r_s/r_g$ thus indicates the scale to which the pattern of the focusing grill is enlarged as it is projected by the blue scanning beam on the phosphor screen. Near the center the projection is geometrically similar and the magnification is $M_0$; for larger values of the deflection angle $\phi$, however, the additional term with $\sin_2\phi$ indicates that the magnification increases toward the margins of the picture; the line pattern on the screen must exhibit pincushion-shaped distortion.

This distortion is generally very small and becomes smaller as the distance a' between the two grills is decreased. The deviation of the required line pattern from a geometrically similar pattern with the magnification $M_0$ is given by:

$$r_s-M_0r_g=a'\sin^3\theta\left[1+\frac{1}{2}\frac{a}{L}\left(1+\frac{1}{2}\frac{a'}{a}\right)\left(1+\frac{a'}{a}\right)\cdots\right] \tag{9}$$

If the maximum half-angle of deflection is 30° and the same geometrical parameters are assumed as before (a=0.75 inch, a'/a=1/8, L=13 inches), the maximum value of this deviation is 0.014 inch. Furthermore, the maximum deviation from a geometrically similar pattern with the optimum value of the magnification, which is slightly larger than $M_0$, is only 1/4 of this amount, or less than 0.004 inch. Consequently, for the parameters given, a pattern of equidistant straight phosphor lines could be employed with a grill consisting of equidistant wires mounted in a common plane. The width of each individual phosphor line would be approximately:

$$M_0d/3\cong\frac{d}{3}\left(1+\frac{a+a'}{L+a'}\right) \tag{10}$$

which is very slightly greater than a third of the pitch d of the focusing grill.

More generally, the master for preparing the phosphor screen could be prepared by electronic projection, as indicated in a copending application of Harold B. Law, Serial No. 277,133 filed concurrently herewith. In this case there are no limitations with respect to the deflection angle which may be employed except such as may be imposed by difficulties in the design of the yoke and eventually excessive astigmatism in the lens elements of the grill. The effect of the auxiliary grill in broadening the lines into which an initially parallel electron beam is concentrated on the screen can be shown to be extremely small for reasonable values of the pitch of the auxiliary grill (e.g. 0.020 inch) and of the deflection half-angle (e.g. 30°); it exists only in oblique directions of deflection, particularly the corners of the picture.

SYSTEM II (FIG. 5)

Quite similar relations can be set up for System II, in which the positions of the auxiliary grill and the focusing grill are interchanged. Again, the auxiliary grill 11 is at a higher voltage $\overline{V}'$ as compared with the common voltage V of the focusing grill 9 and the phosphor screen 7.

CONDITION OF SHARP FOCUS

The relationship between the geometrical parameters of the grill-screen system and the applied voltages which leads to the concentration of a parallel incident beam into sharp parallel lines on the screen is here:

$$\frac{a'}{a}=\frac{\sqrt{\overline{V}'}-\sqrt{\overline{V}}}{2\sqrt{V}-\sqrt{\overline{V}'}}\cdot\frac{\overline{V}'}{\overline{V}}=\left(\frac{1+2a'/a}{1+a'/a}\right)^2 \tag{11}$$

Thus, if, as before a=0.75 inch and a'=a/8=0.0938 inch as well as V=12,000 volts, it is necessary to make $\overline{V}'$=14,850 volts.

MAXIMUM BROADENING OF SCANNING SPOT IN DIRECTION OF WIRES OF FOCUSING GRILL AND OF PHOSPHOR LINES

The maximum broadening of the scanning spot in a direction parallel to or along the phosphor lines, resulting from the defocusing fields about the auxiliary grill wires, is now:

$$2\Delta_z=d'(V/\overline{V}')^{1/2} \tag{12}$$

where d' is the pitch of the auxiliary grill. For the example given above the maximum broadening thus becomes 0.9 d'. This broadening does not affect the color purity of the picture, but only its sharpness. It is somewhat less than in System I and, as there, can be reduced by reducing the separation of grill wires in the auxiliary grill.

RELATION BETWEEN CONVERGENCE OF BEAMS AND GEOMETRICAL DIMENSIONS OF STRUCTURE. (CONDITION OF SHARP FOCUS ASSUMED)

The relations between the convergence angle $\alpha$, the gun separation $y_c$, both defined as for System I, and the remaining geometric parameters of the tube are given below:

$$\alpha=y_c/L \text{ and } \alpha=\frac{M_0d\left(1+\frac{3a'}{2a}\right)}{3a\left(1+\frac{a'}{a}\right)^2} \tag{13}$$

Hence:

$$a=\frac{d\,L\left(1+\frac{3}{2}\frac{a'}{a}\right)}{3y_c\left(1+\frac{a'}{a}\right)^2}\Big/\left(1-\frac{d}{3y_c}\right) \tag{14}$$

The pattern magnification near the center of the picture is:

$$M_0=1+\frac{a}{L}\frac{\left(1+\frac{a'}{a}\right)^2}{\left(1+\frac{3a'}{2a}\right)} \tag{15}$$

Thus, if as before, $a=0.75$ inch, $a'/a=1/8$, $L=12$ inches, $d=0.0208$ inch, $M_0=1.062$, $\alpha=0.0092$ radian (0.53°), and $y_c=0.12$ inch.

RELATION BETWEEN PHOSPHOR LINE PATTERN AND FOCUSING GRILL PATTERN

For a ray leaving the center of deflection and passing through the centers of the grill apertures the ratio of the radial coordinate of the intersection with the screen to that of the intersection with the focusing grill is now given by:

$$\frac{r_s}{r_g}=1+\frac{2(a'+a)V}{L(\overline{V}-V)}\cos\theta\left(\sqrt{\cos^2\theta+\frac{\overline{V}'-\overline{V}}{V}}-\cos\theta\right)=$$

$$M_0-(M_0-1)\frac{a'}{2a}\frac{1}{\left(1+\frac{2a'}{a}\right)}\sin_2\theta+\ldots \quad (16)$$

In System II the magnification is seen to decrease toward the edges of the picture, so that the phosphor line pattern must exhibit a slight barrel-shaped distortion as compared with the wire pattern of the focusing grill. The deviation from a geometrically similar pattern with the magnification $M_0$ is less than half as large as for System I:

$$r_s-M_0r_g\cong-\frac{a'}{2}\left(1-\frac{3a'}{2a}\right)\sin^3\theta+\ldots \quad (17)$$

This becomes, for a maximum half angle of 30° and the same geometrical parameters as assumed up to now, at most equal to 0.005 inch. The deviation from the geometrically similar pattern with the optimum magnification is now only about 0.001 inch, so that the exact phosphor line pattern may readily be replaced by a pattern consisting of equidistant straight lines.

SYSTEM III

In a third system, shown in FIG. 6, the disposition of focusing grill 9 and auxiliary grill 11 is as in System II (FIG. 5) but, now, the auxiliary grill 11 and the phosphor screen 7 are connected together, and placed at the higher voltage V relative to the voltage of the focusing grill $\overline{V}$. This system will not suppress completely the return of back-scattered electrons to the phosphor screen, nor the acceleration of secondary electrons from the focusing grill to the screen. However, both effects can be kept small if the ratio $a'/a$ is made small. The system has the advantage of making the screen voltage equal to the maximum voltage in the tube and slightly reducing the deflecting power required.

The condition of sharp focus now becomes:

$$\frac{a'}{a}=\frac{V-\overline{V}}{4\sqrt{V\overline{V}}-2V};\ \sqrt{\frac{\overline{V}}{V}}=\frac{1}{1+\frac{2a'}{a}}\left(\sqrt{1+\frac{2a'}{a}+\frac{4a'^2}{a^2}}+\frac{2a'}{a}\right) \quad (18)$$

For $a'/a=1/8$, $V=12{,}000$ volts, this requires for the focusing grill voltage $\overline{V}=9{,}630$ volts ($V/\overline{V}=1.246$).

The maximum broadening of the scanning spot in a direction along the phosphor lines is:

$$2\Delta z=d'\left(2\sqrt{\frac{\overline{V}}{V}}-1\right) \quad (19)$$

For the above parameters this is 0.79 d', d' being again the spacing between wires in the auxiliary grill.

RELATION BETWEEN CONVERGENCE OF BEAMS AND GEOMETRICAL DIMENSIONS OF STRUCTURE (CONDITION OF SHARP FOCUS ASSUMED)

The relations between the convergence angle $\alpha$, the gun separation $y_c$, both defined as for Systems I and II, and the remaining geometric parameters of the tube are given below:

$$a=\frac{y_c}{L};\ \alpha=\frac{M_0d}{3}\Bigg/\left\{\frac{2a'}{1+\sqrt{\frac{\overline{V}}{V}}}+a\sqrt{\frac{\overline{V}}{V}}\right\} \quad (20)$$

Hence:

$$a=\frac{dM_0}{3\alpha\left(1+\frac{2a'}{a}\right)^2}\frac{1+\frac{4a'}{a}+12\left(\frac{a'}{a}\right)^2+\left(1+\frac{6a'}{a}\right)\sqrt{1+\frac{2a'}{a}+4\left(\frac{a'}{a}\right)^2}}{1+\frac{2a'}{a}+\sqrt{1+\frac{2a'}{a}+4\left(\frac{a'}{a}\right)^2}} \quad (21)$$

The magnification near the center of the picture is given by:

$$M_0=1+\frac{a\left(1+\frac{2a'}{a}\right)}{L}\left\{\frac{1}{\frac{2a'}{a}+\sqrt{1+\frac{2a'}{a}+4\left(\frac{a'}{a}\right)^2}}+\frac{2a'/a}{1+4\frac{a'}{a}+\sqrt{1+\frac{2a'}{a}+4\left(\frac{a'}{a}\right)^2}}\right\} \quad (22)$$

From these formulas it may be concluded that for $a=0.75$ inch, $a'/a=1/8$, $L=13$ inches, $d=0.0208$ inch, $M_0=1.059$, $\alpha=0.0097$ radian (0.56°), $y_c=0.126$ inch.

The pattern distortion is barrel-shaped and of the same order as for System I.

The following formulas indicate the condition that a parallel beam of electrons incident on the target assembly is concentrated into a series of sharp lines on the target for the more general circumstance that all three voltages V, $\overline{V}$, and $\overline{V}'$, applied to the target, focusing grill, and auxiliary grill, respectively, differ from each other. If the focusing grill is adjacent to the target the condition becomes:

$$\frac{a'}{a}=\frac{\overline{V}'-\overline{V}}{(2\sqrt{\overline{V}}-\sqrt{\overline{V}})(\sqrt{\overline{V}}+\sqrt{V})} \quad (23)$$

If the auxiliary grill is adjacent to the target the condition becomes:

$$\frac{a'}{a}=\frac{\overline{V}'-\overline{V}}{(2\sqrt{\overline{V}}-\sqrt{\overline{V}'})(\sqrt{\overline{V}}'+\sqrt{\overline{V}})} \quad (24)$$

By adjusting the value of the target voltage V relative to the other voltages $\overline{V}$ and $\overline{V}'$, subject to the above conditions, it is possible to balance the efficient utilization of the beam power against greater or less complete suppression of spurious electrons, including electrons scattered with high velocity at the grill wires.

The double-grill focusing system of the present invention can be employed to advantage also in a system employing a single beam and utilizing voltages applied between successive wires of a bi-part focusing grill to shift the beam electrons from one set of phosphor lines on the screen to another. Such a system is shown in FIGS. 7, 8 and 9. The auxiliary grill which is designated 39 in FIG. 7, has been omitted, in the interest of clarity, from FIG. 8. As shown, however, in FIG. 8 the wires of the focusing grill (which is indicated generally at 41 in FIG. 7) are stretched over two insulating guides 43 and 45 forming two electrically connected sets 46 and 47. One set may be hooked back on the insulator on one side, the other on the other side, attachment to hooks on two conducting electrodes 48, 49 occurring on two opposite sides of the grill. The order of the phosphor strips (see FIG. 7) is now different than for the three-beam "directional beam" tubes of FIGS. 1 to 6, inclusive. In this example the frequency of occurrence of one of the three colors is twice that of each of the other two colors. As here shown it is GRGBGRGBGRGB in place of RBGRBGRBG and the desired deflection is approximately $\pm d/2$ in place of $\pm d/3$. From the fields between the wires the deflection voltage applied between the wires necessary to produce this deflection may be shown to be (for a grill arrangement corresponding to System I):

$$\tilde{V}=\frac{2VdM_0}{\pi a}\ln 1.27\frac{d}{D} \qquad (25)$$

where D is the wire diameter of the focusing grill and "ln" is the natural logarithm, e.g. for $d=0.020$ inch, $D=0.002$ inch, $a=0.57$ inch (corresponding to $\alpha\cong 1°$), $V=12{,}000$ volts, $M_0=1.049$, $\tilde{V}=720$ volts. The deflecting voltage $\tilde{V}$ may be either in the form of a step voltage 51 (FIG. 9) to give the proper sequence of reproduced colors (e.g. BGRBGRBGR) or more conveniently, in the form of a sinusoidal variation 53 (FIG. 9) with rms amplitude:

$$V_{rms}=\sqrt{2/3}\tilde{V} \qquad (26)$$

A blanking signal 55 (FIG. 9) with three times the color change frequency must be applied to the grid (or cathode) of the gun of the tube to assure that the beam 57 (FIG. 7) is biased off except when the deflecting voltage on the bi-part grill 46—47 is such as to center the electron current on a set of the phosphor lines.

Considered purely from the viewpoint of mechanical construction, the essential features of the tubes thus far described is the employment of (i) two field electrode grills 9 and 11 made up of wires or other elements having parallel-slit openings between them so that the two sets of wires or slits are at right angles to each other, in combination with (ii) a "line screen" 7 wherein the lines extend in rows parallel to the wires or slits in one or another of said grills. Considered from the viewpoint of the electron-optics involved, the target assemblies of these tubes, when operated in the manner described in connection with FIGS. 1 to 9, inclusive, may be said to comprise an electron-optical system made up of (i) at least one coverging lens and (ii) at least one diverging lens and including (iii) "means" (i.e. the specified orientation of the wires of each grill with respect to the lines on the screen or "target") for so orienting the defocusing action of the diverging lens that it is in a direction along the phosphor lines so that it does not produce any color dilution.

The virtual absence of color-dilution (which might be present as an incident to the necessary presence of a divergent lens in the system) can also be achieved irrespective of the orientation of the auxiliary grill by making said grill of very fine, very closely spaced, wires. As an example: In practical embodiments of the tubes shown in FIGS. 1 to 8, inclusive, grill wires of a diameter of 0.002 of an inch and spaced apart approximately .004 of an inch, would prove entirely satisfactory. It was found that the diverging effect of the auxiliary grill 11 was minimized when a wire mesh (11', FIG. 10) consisting of both warp and weft strands with 200 openings per linear inch was substituted for the parallel wire structure of the auxiliary grill 11 shown in FIGS. 1 to 8. The principal advantage of an auxiliary grill formed of such fine, closely spaced, wires is that it may be inserted in the target assembly without any regard to the relative orientation with respect to the wires of the focusing grill. This, obviously, simplifies the manufacture of the screen-assembly. It need scarcely be pointed out, however, that a grill or mesh of such fine construction will absorb more beam current than one of more open-work construction. This disadvantage, however, is offset to a large degree by the fact that the openings in the other or focusing grill (9, FIGS. 1–6; 9', FIG. 10) can be several times larger than they are in a tube operating on the Crookes-shadow principle.

All of the color-tubes thus far described in this specification employ target electrodes of the "line-screen" variety. The invention, however, is also applicable to tubes employing a so-called "dot-screen." Thus, referring to FIG. 10, there is shown a screen-assembly which includes a screen electrode 7' having a target surface made up of a multiplicity of groups of red (R), blue (B) and green (G) phosphor dots which, in the instant case, are arranged in a repetitive "hexagonal" pattern similar to one shown in the copending application of Alfred C. Schroeder, Serial No. 730,637, filed February 24, 1947, now U.S. Patent 2,595,548, issued May 6, 1952. (A "hexagonal" pattern is one wherein each dot, except the ones near the edges, is surrounded by six other dots.) As in the case of the line-screen, the target surface of this dot-screen 7' is provided with a continuous electron-transparent conductive coating 13'. The other two elements of the screen or target assembly comprise (1) a focusing grill in the form of a thin metal plate 9' containing a multiplicity of hexagonally arranged apertures corresponding in number to the number of groups (of three) color-phosphor dots on the screen electrode 7' and (2) an auxiliary grill in the form of a fine wire mesh 11' mounted adjacent to the gun or target side of the apertured focusing grill or plate 9'.

The relative potential distribution among these three electrodes of the screen-assembly may be made the same as described in connection with the line-screen tubes of FIGS. 1–8. When the potential distribution is such that the electric field on the screen-side of the focusing grill 9' has a greater tendency to accelerate electrons than the field on its gun-side, the resultant lens field adjacent to the apertures in said focusing grill is that of an axially symmetrical or "spherical" lens (instead of a "cylindrical" lens) whose center of symmetry is such that the red, blue and green beams passing through the lens (and originating at the three centers of symmetry, see FIG. 10) converge toward the centers of the dots R, B and G, respectively. As a consequence, the lens action of the focusing grill 9' is such as to converge the beam electrons from any one gun toward the centers of the dots of the color allotted to that gun. The close spacing of the wires of the auxiliary grill 11' renders the diverging effect of this lenticular electrode so small that the beam electrons do not spread beyond the periphery of the dot upon which said beam impinges.

Where, as in FIG. 10, the focusing grill 9' is mounted next adjacent to the dot-screen 7' the beam electrons will be confined to the separate areas or dots R, B and G when the following relation exists between "a" (the spacing between the screen 7' and the focusing grill 9'), a' (the spacing between the focusing grill 9' and the auxiliary grill 11'), V (the voltage applied to the screen 7'), $\overline{V}$ (the voltage applied to the focusing grill 9') and $\overline{V}'$, (the voltage applied to the auxiliary grill 11'):

$$\frac{a'}{a}=\frac{\overline{V}'-\overline{V}}{(3\sqrt{\overline{V}}-\sqrt{V})(\sqrt{\overline{V}}+\sqrt{V})} \qquad (27)$$

(Here, as in all other equations the several voltages V, $\overline{V}$, $\overline{V}'$ are measured with respect to the voltage of the beam cathode as zero.)

If the focusing grill 9' and screen 7' are connected electrically so that:

$$\overline{V}=V \qquad (28)$$

this condition becomes:

$$\frac{\overline{V}'}{V}=1+\frac{4a'}{a} \qquad (29)$$

When the positions of the auxiliary grill and focusing grill are interchanged (as e.g. in FIGS. 4 and 5), so that the auxiliary grill 11' is adjacent to the screen or target electrode 7', the relation which must be satisfied in order that the parallel beam of electrons incident on the target assembly is concentrated into the small dots on th etarget is:

$$\frac{a'}{a}=\frac{\overline{V}'-\overline{V}}{(3\sqrt{\overline{V}}-\sqrt{\overline{V}'})(\sqrt{\overline{V}'}+\sqrt{\overline{V}})} \quad (30)$$

(Here the definition of the several symbols in the Formula 30 is the same as for Equation No. 27, supra.)

If the voltage (V) applied to the screen 7' and the voltage ($\overline{V}$) applied to the focusing grill 9' is the same (i.e. ($\overline{V}$=V) the foregoing relation becomes:

$$\frac{\overline{V}'}{V}=\left(\frac{1+3a'/a}{1+a'/a}\right)^2 \quad (31)$$

The invention is also applicable to color "pickup" or camera tubes. Such a tube is shown in FIG. 11. Here the photosensitive screen, which is designated 61 in FIG. 11, may be either of the photo-emissive variety shown in FIG. 12 or of the photoconductive variety shown in FIG. 13. In either event its photosensitive target surface (61a, FIG. 12; 61b, FIG. 13) is backed by a transparent electrode (63a, FIG. 12; 63b, FIG 13) such as Nesa glass, and a set of parallel filter strips R, G and B which transmit red, green and blue light, respectively. The focusing grill 65' (FIG. 11) is placed a distance a in front of the photosensitive surface of the screen 61. It consists of thin wires parallel to and aligned with the filter strips, with three strips per wire spacing. The auxiliary grill 67 is placed at a distance a' in front of the focusing grill 65, with its wires extending in the opposite direction, in this case, vertically. The target assembly is scanned by a single beam 69 whose direction of incidence on the photo-emissive target 61 is varied periodically, for example, in the manner taught by R. R. Law in copending application Serial No. 143,405, filed February 10, 1950, now U.S. Patent 2,969,571. In this manner a video signal is obtained from the "signal plate" (i.e. the transparent electrode 63a, FIG. 12 or 63b, FIG. 13) which corresponds to the output of the sampler in a "dot-sequential" transmitter using a simultaneous camera if the rate of changing the beam incidence is varied at the sampling frequency; if varied at field frequency it corresponds to the output of a "field-sequential" color camera.

If the cathode of the gun 71 of the tube is grounded, a voltage $\overline{V}$ is applied to the focusing (color-selecting) grill 65 and a voltage $\overline{V}'$ to the auxiliary grill 67, the preferred relationship between the voltages and the spacings a, a' is:

$$\frac{a}{a'}=\frac{2\overline{V}}{\overline{V}'-V} \quad (32)$$

which, for V=30 volts and V'=400 volts, leads to $$\frac{a}{a'}=0.16$$

This value corresponds to the narrowest concentration of the beam on the photosensitive areas corresponding to the filter strips R, G and B. If a photoconductor 61b (FIG. 13) is employed, the back electrode 63b, which acts also as the signal plate, is biased with respect to the gun cathode as in any pickup tube of the vidicon variety. When a photoconductive surface (61b) is used it is preferably one having an appreciable spectral response throughout the visible spectrum, for example, an appropriate antimony-sulphide selenium layer.

In view of the much lower voltages employed (e.g. $\overline{V}'$=400 volts, $\overline{V}$=30 volts), it is even more essential than in color-kinescopes to employ good magnetic shielding (not shown) about the tube.

In the first paragraph of this specification reference is made to the fact that the invention is also applicable to cathode-ray tubes designed for use in stereoscopic television systems. In such an embodiment of the invention, referring now to FIG. 14, the screen is made up of a uniformly metallized phosphor layer 81 on a thin transparent support 83 which bears equally spaced filter strips 85 and 87 of polarizing material, successive strips operating to polarize incident light in mutually perpendicular directions. These polarizing strips 85 and 87 (as in the case of the color strips R, B and G in the earlier described embodiments of the invention) are disposed parallel to the wires of the focusing grill 89, and the wires of the auxiliary grill 91 extend at right angles to said strips. The spacing of the polarizing strips is made equal to one-half the spacing of wires of the focusing grill times the magnification ($M_0$) of the grill pattern on the screen. (The position of the tow grills 89 and 91 may be reversed, if desired.)

The tube contains two guns, 93 and 95, which are so disposed that the beam electrons from one gun fall exclusively on the filter strips 85 of one polarity and the beam electrons from the other gun upon the filter strips 87 of the other polarity. The screen is viewed by the observer through spectacles whose lenses 97 and 99 are polarized in opposite directions corresponding to the directions of polarization of the filter strips 85 and 87, respectively. In this manner each eye sees the picture reproduced through one of the two sets of filter strips only. Since it is assumed that the signals applied to the grids of the guns 93 and 95 are supplied by the two images formed in a stereoscopic television camera (not shown) the composite image perceived by the observer is a three-dimensional replica of the scene being televised.

From the foregoing description it is believed apparent that cathode-ray tubes constructed in accordance with the principles of the invention effect an efficient utilization of their scanning beam or beams without loss of contrast and, in the case of color-tubes, without color-dilution resulting (a) from the return of high velocity back-scattered electors to the color-screen as well as from (b) the acceleration of low velocity secondary electrons from other elements in the tube.

What is claimed is:

[1. The combination with a cathode-ray device comprising a source of beam electrons and a target-assembly including first and second lenticular field-electrodes and a target electrode mounted in spaced-apart relationship in parallel planes and in the order named within an evacuated envelope, of means including a source of voltage for energizing each of said electrodes to establish at least one beam-focusing electron-lens field within said target assembly, the voltage applied to said target electrode being substantially no higher than the voltage applied to said first and second lenticular field-electrodes.]

2. The invention as set forth in claim [1] *9* and wherein said target-electrode is of the "line screen" variety, the apertures in one of said field electrodes extending parallel to the lines on said target-electrode and the apertures in said another of said field electrodes extending substantially at right angles to said lines.

3. The invention as set forth in claim [1] *9* and wherein one of said field-electrodes is of bi-part construction and consists of alternate and intermediate wires disposed in a common plane.

[4. The invention as set forth in claim 1 and wherein said target electrode and said second field-electrode have substantially the same potential applied thereto.]

5. The invention as set forth in claim [1] *9* and wherein said target electrode and said second field-electrode have substantially the same potential applied thereto, and said first field-electrode has a higher potential applied thereto.

6. The invention as set forth in claim [1] *9* and wherein the potential applied to said second field-electrode is higher than the voltage applied to said target electrode.

7. The invention as set forth in claim [1] *9* and wherein said target electrode and said first field-electrode have substantially the same potential applied thereto, and said second field-electrode has a higher potential applied thereto.

[8. The invention as set forth in claim 1 and wherein said target electrode and said second field-electrode have substantially the same potential applied thereto, and said first field-electrode has a lower potential applied thereto.]

9. The combination with a cathode-ray tube of the kind wherein an electron-beam is subjected to a scanning movement and to an accelerating force of sufficient intensity to produce spurious electrons upon impact of said beam with at least one member of a target assembly which includes (i) a plurality of lenticular field-electrodes and (ii) a target electrode effectively divided into a multiplicity of image-areas, of means for subjecting said spurious electrons to an electric field of such direction as to move said spurious electrons away from said target electrode, said electric field operating to distort the cross-sectional contour of said beam and hence to distort its pattern of impact upon said target electrode, and electron-optical means for confining the boundaries of said distorted beam to the particular areas of said target electrode to which it is directed by said scanning movement.

10. The invention as set forth in claim 9 and wherein (a) said target-electrode is of the "line-screen" variety, (b) wherein said lenticular field-electrodes are of the cylindrical-lens variety and, jointly with said target electrode, comprise the means for subjecting said beam to said electric-field and (c) wherein said electron-optical means comprises an arrangement of said field electrodes wherein the generatrices of the cylindrical-lens elements of one electrode are substantially parallel to the lines on said line-screen and the generatrices of the lens elements of another of said electrodes are in a direction substantially at right angles thereto.

11. The invention as set forth in claim 9 and wherein (a) said target electrode is of the "dot-screen" variety, (b) wherein said lenticular field-electrodes are mounted in spaced apart relationship, successively, in the path of said beam, (c) wherein at least one of said field-electrodes is of the spherical-lens variety, (d) wherein said field-electrodes jointly with said target electrode comprise the means for subjecting said beam to said electric field and (e) wherein said electron-optical means comprises another of said lenticular field electrodes, said last mentioned electrode comprising a foraminous structure wherein the apertures are so closely spaced that the distorting effect of said structure upon said beam is negligible as compared to the diameter of the individual dots upon said dot-screen.

12. The combination with a cathode-ray device comprising a source of beam electrons and a target assembly including first and second field-electrodes and a target electrode of the "line-screen" variety mounted in spaced-apart relation in the order named within an evacuated envelope, said field electrods containing line-like apertures with the apertures in said first field-electrode extending in a direction substantially at right angles to the lines on said "line-screen" and the apertures in said second field-electrode extending in a direction substantially parallel to said screen-lines, of means for applying an operating potential to said first field-electrode and a discrete common operating potential to said second field-electrode and to said target electrode all in accordance, substantially, with the formula:

$$\frac{\overline{V}'}{V}=1+\frac{2a'}{a}$$

wherein:

$\overline{V}'$=the operating potential applied to said first field-electrode,

V=the common operating potential applied to said second field-electrode and to said target electrode, a'=the spacing between said first and second field-electrodes, a=the spacing between said second field-electrode and said target electrode.

13. The combination with a cathode-ray device comprising a source of beam electrons and a target assembly including first and second field-electrodes and a target electrode of the "line-screen" variety mounted in spaced-apart relation in the order named within an evacuated envelope, said field-electrodes containing line-like apertures with the apertures in said first field-electrode extending in a direction substantially parallel to the lines on said "line-screen" and the apertures in said second field-electrode extending in a direction substantially at right-angles to said screen-lines, of means for applying an operating potential to said second field-electrode and a discrete common operating potential to said first field-electrode and to said target electrode all in accordance, substantially, with the formula:

$$\frac{\overline{V}'}{V}=\left(\frac{1+2a'/a}{1+a'/a}\right)^2$$

wherein:

$\overline{V}'$=the operating potential applied to said second field-electrode,

V=the common operating potential applied to said first field-electrode and to said target electrode, a'=the spacing between said field-electrodes, a=the spacing between said second field-electrode and said target electrode.

14. The combination with a cathode-ray device comprising a source of beam electrons and a target assembly including first and second field-electrodes and a target electrode of the "line-screen" variety mounted in spaced-apart relation in the order named within an evacuated envelope, said field electrodes containing line-like apertures with the apertures in said first field-electrode extending in a direction substantially parallel to the lines on said "line-screen" and the apertures in said second field-electrode extending in a direction substantially at right-angles to said screen-lines, of means for applying an operating potential to said first field-electrode and a discrete common operating potential to said second field-electrode and to said target electrode all in accordance, substantially, with the formula:

$$\sqrt{\frac{V}{\overline{V}}}=\frac{1}{1+\frac{2a'}{a}}\left(\sqrt{1+\frac{2a'}{a}+\frac{4a'^2}{a^2}}+\frac{2a'}{a}\right)$$

wherein:

V=the common operating potential applied to said target electrode and to said second field-electrode, $\overline{V}$=the operating potential applied to said first field-electrode, a=the spacing between said second field-electrode and said target electrode, and a'=the spacing between said first and second field-electrodes.

15. The combination with a cathode-ray device comprising a source of beam electrons, a first field-electrode containing a multiplicity of parallel line-like apertures, a second field-electrode containing a multiplicity of line-like apertures extending at right angles to the apertures on said first field-electrode, and a target electrode, all mounted in spaced-apart relation in the order named within an evacuated envelope, of means including a source of voltage for energizing said device in accordance, substantially, with the formula:

$$\frac{a'}{a}=\frac{\overline{V}'-\overline{V}}{(2\sqrt{\overline{V}}-\sqrt{\overline{V}})(\sqrt{\overline{V}}+\sqrt{\overline{V}}}$$

wherein:

a'=the spacing between said first and second field-electrodes, a=the spacing between said second field-electrode and said target electrode, V=the voltage applied to said target electrode, $\overline{V}$=the voltage applied to said second field-electrode, $\overline{V}'$=the voltage applied to said first field-electrode, whereby said beam, when subjected to a scanning movement, will trace upon said target electrode a series of narrow lines parallel to the apertures of said second field-electrode.

16. The combination with a cathode-ray device comprising a source of beam electrons, a first field-electrode containing a multiplicity of parallel line-like apertures, a second field-electrode containing a multiplicity of line-like apertures extending substantially at right angles to the apertures in said first field-electrode and a target electrode, all mounted in spaced-apart relation in the order named wtihin an evacuated envelope, of means including a source of voltage for energizing said device in accordance, substantially, with the formula:

$$\frac{a'}{a}=\frac{\overline{V}'-\overline{V}}{(2\sqrt{\overline{V}}-\sqrt{\overline{V}'})(\sqrt{\overline{V}'}+\sqrt{V})}$$

wherein:

a'=the spacing between said first and second field-electrodes, a=the spacing between said second field-electrode and said target electrode, V=the voltage applied to said target electrode, $\overline{V}$=the voltage applied to said first field-electrode, $\overline{V}'$=the voltage applied to said second field-electrode, whereby said beam, when subjected to a scanning movement, will trace upon said target electrode a series of narrow lines parallel to the apertures of said first field-electrode.

17. The combination with a cathode-ray device comprising a source of beam electrons, first and second apertured field-electrodes and a target electrode mounted in spaced-apart relation in the order named in an evacuated envelope, the apertures in said second field-electrode comprising a repetitive pattern of circular holes and said first field-electrode containing apertures whose smallest diameter is less than the diameter of the circular holes in said second field-electrode, of means including a source of voltage for energizing said device in accordance, substantially, with the formula:

$$\frac{a'}{a}=\frac{\overline{V}'-\overline{V}}{(3\sqrt{\overline{V}}-\sqrt{\overline{V}'})(\sqrt{\overline{V}}+\sqrt{V})}$$

wherein:

a'=the spacing between said first and second-field electrodes a=the spacing between said second field electrode and said target electrode V=the voltage applied to said target electrode $\overline{V}$=the voltage applied to said second field electrode $\overline{V}'$=the voltage applied to said first field electrode whereby said beam, when subjected to a scanning movement, will trace upon said target electrode a series of circular spots, in a pattern corresponding to the pattern of holes in said second field-electrode.

18. The combination with a cathode-ray device comprising a source of beam electrons and a target assembly including first and second apertured field-electrodes and a target electrode of the "dot-screen" variety mounted in spaced apart relation in the order named with an evacuated envelope, the apertures in said second field electrode being of substantially circular contour and arranged in a pattern corresponding to the pattern of dot groups on said "dot screen" and the apertures in said first field-electrode having a diameter smaller than the diameter of the circular apertures in said second field-electrode, of means for applying an operating potential to said first field-electrode and a discrete common operating potential to said target and second field-electrode in accordance, substantially, with the formula:

$$\frac{\overline{V}}{V}=1+\frac{4a'}{a}$$

wherein:

V=the common operating potential applied to said target electrode and to said second field-electrode.

$\overline{V}'$=the operating potential applied to said first field-electrode a=the spacing between said target electrode and said second field-electrode a'=the spacing between said first and second field-electrodes.

19. The combination with a cathode-ray device comprising a source of beam electrons, a first field-electrode containing a multiplicity of circular apertures arranged in a repetitive pattern, a second field-electrode containing a multiplicity of apertures whose smallest diameter is much less than the diameter of the circular apertures in said first field-electrode, and a target electrode, all mounted in spaced-apart relation in the order named within an evacuated envelope, of means including a source of voltage for energizing said device in accordance, substantially, with the formula:

$$\frac{a'}{a}=\frac{\overline{V}'-\overline{V}}{(3\sqrt{\overline{V}}-\sqrt{\overline{V}'})(\sqrt{\overline{V}'}+\sqrt{V})}$$

wherein:

a'=the spacing between said first and second-field electrodes a=the spacing between said second field-electrode and said target electrode V=the voltage applied to said target electrode $\overline{V}$=the voltage applied to said first field electrode $\overline{V}'$=the voltage applied to said second field electrode whereby said beam, when subjected to a scanning movement, will trace upon said target electrode a series of circular spots in a pattern corresponding to the pattern of holes in said first field-electrode.

20. The combination with a cathode-ray device comprising a source of beam electrons and a target assembly including first and second apertured field-electrodes and a target electrode of the "dot-screen" variety mounted in spaced-apart relation in the order named within an evacuated envelope, the apertures in said first field-electrode being of substantially circular contour and arranged in a pattern corresponding substantially to the pattern of dot groups on said target electrode and the apertures in said second field-electrode having a diameter smaller than the diameter of the circular apertures in said first field-electrode, of means for applying an operating potential to said second field-electrode and a discrete common operating potential to said target and first field-electrode in accordance, substantially, with the formula:

$$\frac{\overline{V}'}{V}=\left(\frac{1+3a'/a}{1+a'/a}\right)^2$$

wherein:

V=the common operating potential applied to said target electrode and to said first field-electrode $\overline{V}'$=the operating potential applied to said second field-electrode a=the spacing between said target electrode and said second field-electrode a'=the spacing between said first and second field-electrodes.

21. A target assembly for a cathode-ray tube comprising a first set of parallel wires, a second set of parallel wires mounted adjacent to said first set at an angle of substantially 90° with respect thereto, and an electrically conductive target surface comprising a plurality of substantially parallel line-like ray-sensitive areas disposed in parallel relationship with respect to the wires of one of said sets in a position to be scanned by electrons passing between the wires of both sets.

22. The invention as set forth in claim 21 and wherein said line-like ray sensitive areas comprise a multiplicity of groups of phosphor colored areas of different color-response characteristics.

23. The invention as set forth in claim 21 and wherein one of said sets of parallel wires consists of two groups disposed in a common plane with the wires of one group arranged between the wires of the other group and electrically insulated therefrom.

24. A cathode-ray comprising a screen-electrode having a mosaic target surface made up, effectively, of a multiplicity of groups of parallel line-like areas of different ray-sensitive characteristics, a source of beam electrons, means for directing beam electrons from said source onto selected ones of the line-like areas in each of said groups, and a plurality of lenticular field-electrodes each containing a plurality of elongated apertures through which said electrons pass in their transit from said source to said line-like screen areas, the elongated apertures in at least one of said lenticular field electrodes extending in parallel relationship with respect to said line-like screen areas and the elongated apertures in another of said field electrodes extending at an angle of substantially 90° with respect to said line-like screen areas.

References Cited in the file of this patent or the original patent

UNITED STATES PATENTS

| | | |
|---|---|---|
| 1,810,018 | Howes | June 16, 1931 |
| 2,315,367 | Epstein | Mar. 30, 1943 |
| 2,532,511 | Okolicsanyi | Dec. 5, 1950 |
| 2,580,250 | Smith | Dec. 25, 1951 |
| 2,581,487 | Jenny | Jan. 8, 1952 |
| 2,595,548 | Schroeder | May 6, 1952 |
| 2,602,145 | Law | July 1, 1952 |
| 2,606,303 | Bramley | Aug. 5, 1952 |
| 2,660,684 | Parker | Nov. 24, 1953 |
| 2,669,675 | Lawrence | Feb. 16, 1954 |
| 2,692,532 | Lawrence | Oct. 26, 1954 |

FOREIGN PATENTS

| | | |
|---|---|---|
| 866,065 | France | Mar. 31, 1941 |